United States Patent [19]

Phelon et al.

[11] Patent Number: 5,015,901

[45] Date of Patent: May 14, 1991

[54] ROTOR OF A MAGNETMOTIVE DEVICE

[75] Inventors: Russell D. Phelon, Wilbraham, Mass.; Ronald G. Brunelle, Ellington, Conn.

[73] Assignee: R. E. Phelon Company, Inc., East Longmeadow, Mass.

[21] Appl. No.: 491,970

[22] Filed: Mar. 12, 1990

[51] Int. Cl.$^5$ .................. H09K 21/22; H02K 1/22; H02K 21/12; F02P 1/00
[52] U.S. Cl. .................... 310/153; 310/43; 310/156; 310/261; 123/149 D
[58] Field of Search .............. 310/43, 74, 153, 156, 310/261; 123/149 R, 149 D

[56] References Cited

U.S. PATENT DOCUMENTS

| | | | |
|---|---|---|---|
| 3,885,177 | 5/1975 | Phelon et al. | 310/153 |
| 4,179,634 | 12/1979 | Burson | 310/153 |
| 4,295,070 | 10/1981 | Johansson | 310/153 |
| 4,390,804 | 6/1983 | Orova et al. | 310/153 |
| 4,393,320 | 5/1983 | Anderson | 310/156 |
| 4,482,831 | 11/1984 | Notaras et al. | 310/156 |
| 4,710,659 | 12/1987 | Takano et al. | 310/153 |

FOREIGN PATENT DOCUMENTS 2022324 12/1979 United Kingdom ............... 310/153

*Primary Examiner*—Steven L. Stephan
*Assistant Examiner*—Clayton E. LaBalle
*Attorney, Agent, or Firm*—Chapin, Neal & Dempsey

[57] ABSTRACT

Rotor of a magnetomotive device has a discrete permanent magnetic and a ferromagnetic core injection molded within a synthetic plastic body in the form of a flywheel. The core is of integral, laminar construction and includes hub and counterweight portions and a pair of radially extending, circumferentially spaced arm portion. At their outer ends, the arm portions terminate in pole shoes with opposed, undercut edges to retain the discrete permanent magnet therebetween. Each of the arm portions has a laterally extending shoulder portion and, at their inner ends, connect to the hub by narrow neck or stem portions which are resiliently flexible. From the center of rotation of the rotor, the stem portions are each disposed along a given radius. Each of the arm portions of the core is characterized by a configuration and distribution of mass so that its center of gravity is located outward of the given radius whereby centrifugal force generated by high speed rotation of the rotor exerts opposing, inwardly directed forces on the arm portions for clamping the magnet therebetween.

3 Claims, 2 Drawing Sheets

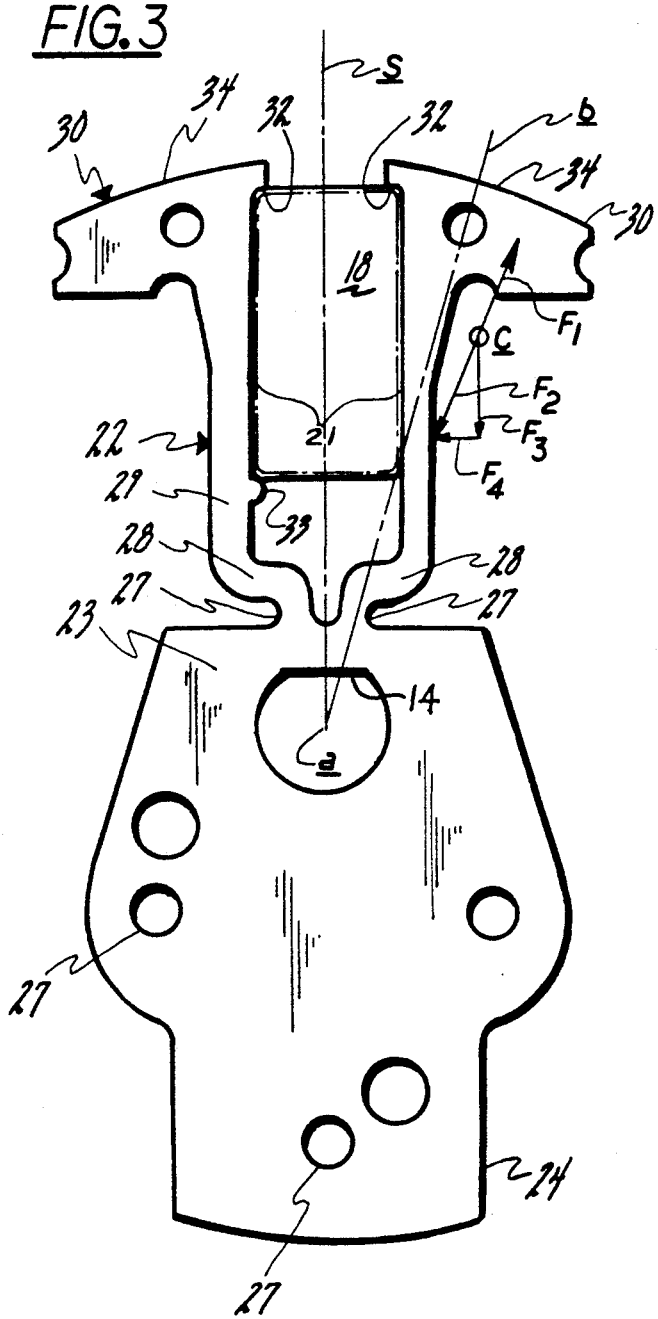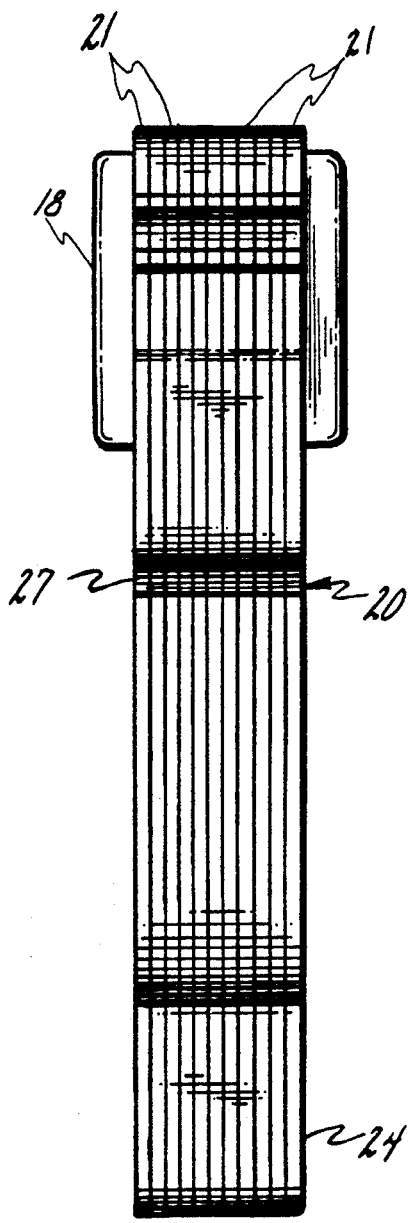

5,015,901

ROTOR OF A MAGNETMOTIVE DEVICE

BACKGROUND OF THE INVENTION

This invention relates to rotors for magnetomotive devices and, more particularly, to such rotors for small internal combustion engines having a magnet and metallic core molded within the body of a synthetic plasic material. The core is structurally independent of the plastic body and is constructed so that at high rotational speeds, centrifugal forces serve to generate clamping forces on the magnet by the core to compensate for the inertial effect of such high speeds.

In the past, rotors for magnetomotive devices which combined permanent magnets and pole pieces and usually served as the engine flywheel, were generally formed of a metallic material, such as aluminum or zinc or a composite thereof, of suitable strength to withstand the inertial stresses of high rotational speeds.

Prior art methods of mounting permanent magnets and pole shoes in magneto flywheel rotors included the casting of the magnet and the pole shoe group directly into the flywheel body which were of sufficient strength to hold the parts in assembled relation at high rpm. It has also been proposed to affix the magnet and pole shoe group to the rotor by fasteners, such as dowels, pins, screws or the use of special bonding agents.

U.S. Pat. No. 4,179,634 to Burson and U.S. Pat. No. 4,482,831 to Notaras disclose the use of dowel and pin type fasteners and specially shaped cavities for retaining the pole shoe magnet group within the die-cast aluminum rotor. When such rotors are operated at high speeds, they are subjected to great centrifugal force and the individual components, especially the high density permanent magnet, tend to separate from the rotor. As a result, synthetic plastic materials have not generally been used in such rotor structures.

Accordingly, the principal object of this invention is to provide an improved rotor for magnetomotive devices composed of an injection molded synthetic plastic body in which is disposed an integral flux carrying core member constructed with magnet retaining arms adapted to exert clamping forces on the magnet so that centrifugal forces generated by the rotation of the rotor prevent high speed failure of the rotor caused by inertial separation of the arms of the core member.

Another object of this invention is to provide an improved rotor of the above type which the core is integral and includes a hub portion mounted on the drive shaft of the engine, a counterweight and magnet clamping arm portions group disposed diametrically opposite the counterweight whereby the unit is structurally independent of the synthetic plastic body of the rotor.

A further object of this invention is to provide an improved rotor of the above type in which the core comprises a resiliently flexible laminated ferrous metal structure.

The above and other objects and advantages of this invention will be more readily apparent from the following description read in conjunction with the accompanying drawings in which:

FIG. 3 is an elevational view showing the permanent magnet and laminated core used in the rotor of FIG. 1, and FIG. 4 is a side elevational view of the core shown in FIG. 3.

Figure 1:
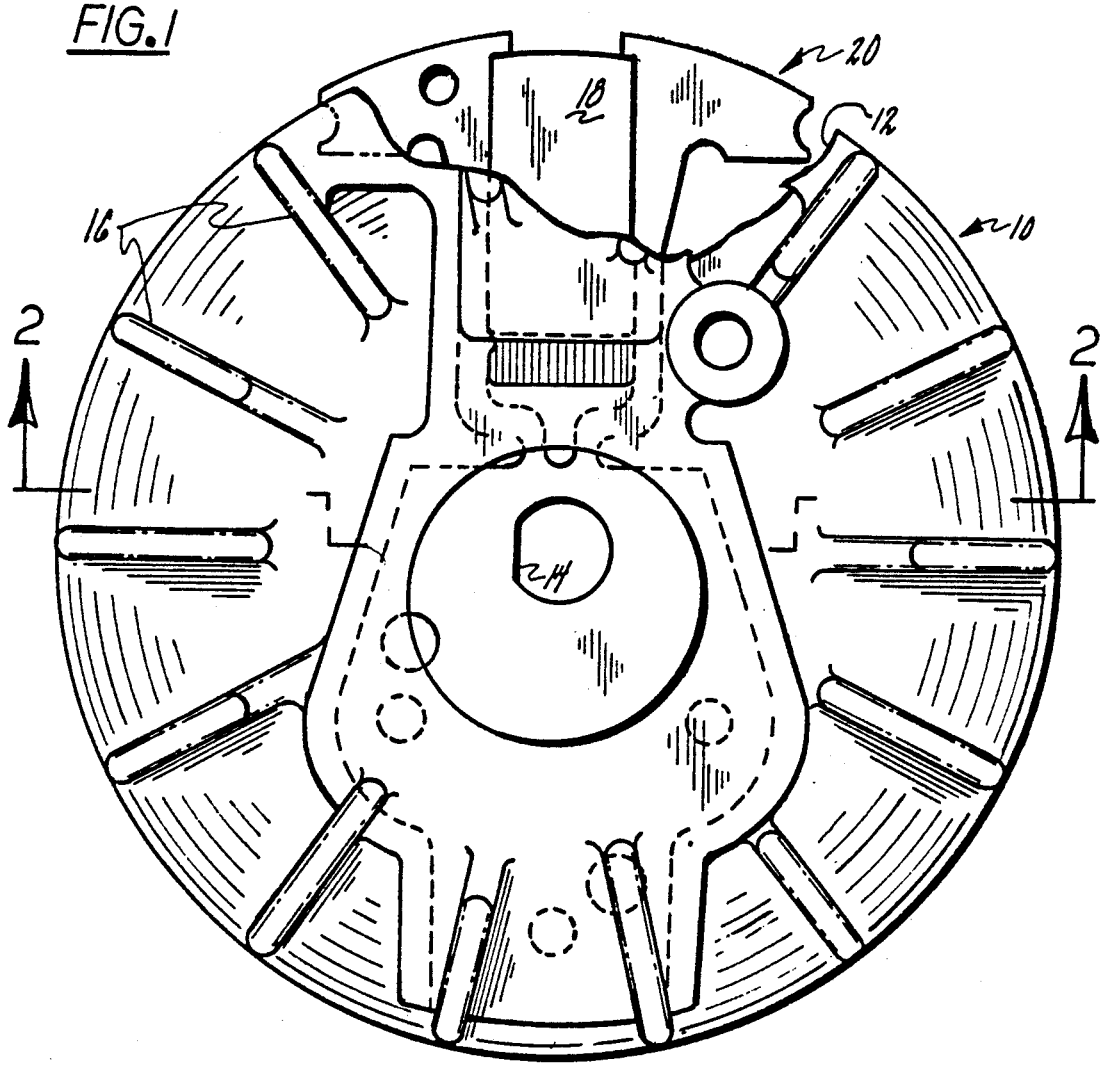
FIG. 1 is an elevational view with portions cut away showing a rotor of the type embodying this invention.
Figure 2:
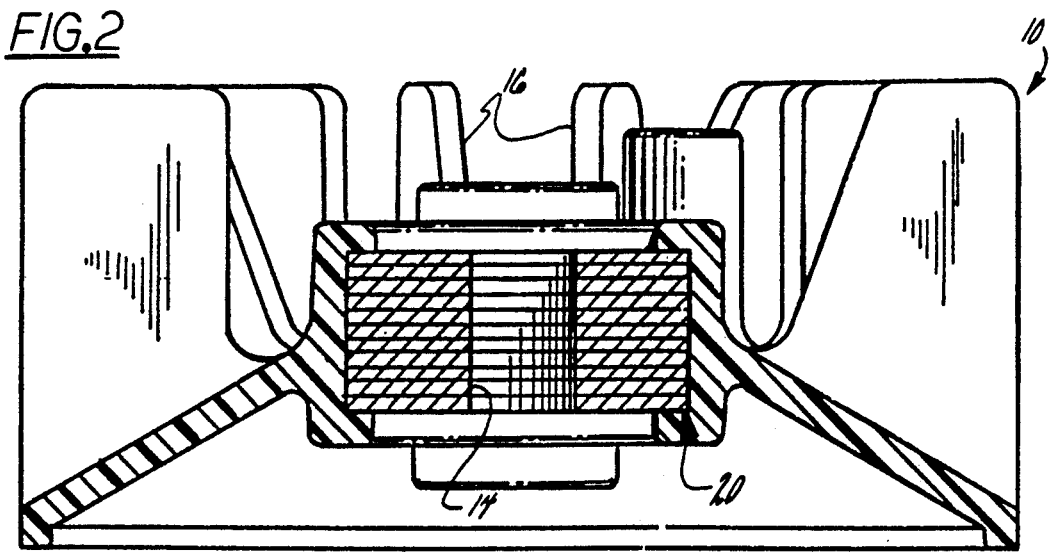
FIG. 2 is a section taken along line 2—2 of FIG. 1.

Referring in detail to the drawing, a rotor of the type embodying this invention is illustrated generally at 10 in FIGS. 1 and 2. As shown, the rotor is of cylindrical configuration and is preferably in the shape of a flywheel for use in ignition systems in small engine applications, such as chain saws, string trimmers and the like. The cooperating stator portion of the magneto (not shown) may be of any suitable construction, such as shown in Piteo U.S. Pat. No. 3,181,677.

The rotor comprises a lightweight but strong, synthetic plastic body 12 with a central bore 14 having a flat edge portion for mounting onto the shaft of an internal combustion engine at a pretermined angular orientation for proper ignition system timing. The plastic body is preferably injection molded to include a plurality of radially extending, circumferentially spaced fins or vanes 16. Molded within the plastic body 12, is a discrete permanent magnet 18 and an integral, ferromagnetic flux-carrying, core member 20. Permanent magnet 18 which, as shown, is in the form of a high density, cubical block of ceramic material which provides a strong source of magnetic flux for inducing an electric current in the coil of a stator for producing an ignition spark.

As best illustrated in FIGS. 3 and 4, the core member is preferably an integral metallic structure which may be formed of a powdered iron core material or composed of individual laminations 21 (FIG. 4) which are stacked in superposed relation and staked or riveted together in any conventional fashion, such as indicated at 27 in FIG. 3. The core 20 provides a desired magnetic flux path with pole pieces or shoes to interact magnetically with the core of an ignition coil (not shown). The core is formed with uniform planar inner surfaces 21 which are parallel and adapted to engage the end surfaces of permanent magnet for surface-to-surface contact. The core member 20 comprises a pair of radially extending, circumferentially spaced arm portions 22 which extend outwardly from a central hub 23 surrounding shaft opening 14. The integral member 20 also includes a counterweight portion 21 which extends diametrically in the opposite direction from arms 22 for dynamic balance of the core member about its axis of rotation a. Thus, the core 20, including its hub portion 23, pole shoes 30 and counterweight 21, has complete structural integrity independent of the plastic body 12.

The arm portions of the core each include a narrow stem or neck portion 27 which extend in spaced relation from the central hub 23 of the core. From neck 27, each arm includes a jog or shoulder portion 28 which extends laterally from the neck 27, elongated parallel portions 29 and circumferentially flared pole shoes 30. Each pole shoe includes an undercut edge, as at 32, to engage the outer edge portions of the magnet 18 to hold the same securely in place between the arms 22 of the core. The core 20 has a plane of symmetry represented at s in FIG. 3 which bisects the magnet 18. A projection 33 disposed on the inner surface 21 of one or both of the arms 22, serves to prevent the inward displacement of the magnet 18.

Bach of the pole shoes 30 takes the form of a segment of a circle, extends over an arc of about 30° and has a cylindrical outer surface 31. The major portion of the mass of each pole shoe is disposed a substantial distance outwardly of the parallel portions 29 of the core 20, whereby the center of gravity of each arm 22, as shown at c in FIG. 3, is located outwardly of a radial line b from the center of rotation a of the rotor and through the center of neck portion 27 of the core. Thus, centrifugal force F-1 acts radially outward on each arm from its center of gravity c. This force is opposed by an equal and opposite stress or tensional force F-2 in each leg of the core 20, particularly in the relatively narrow neck portions 27. The tensional force has two components, F-3 parallel to arm 22 and F-4, perpendicular thereto. Because of its resilient, laminar construction and the broad arcuate configuration on the pole shoes, force F-4 exerts equal and opposite forces on both arms 22 whereby the arms tend to clamp more securely onto the high density, permanent magnet 18 disposed therebetween with increased rotational speed of the rotor, thus compensating for the increased inertial force of the magnet. It is postulated that the center of gravity c seeks, in effect, to align itself with the radial line b. As a result, the faster the rotational speed of the rotor 10, the greater will be the clamping forces exerted on the magnet 18. In this respect, the core 20 and the plastic wheel 12 are each dynamically independent whereby the core 20 of greater density than the plastic body 12 does not depend for its structural integrity upon the strength of the plastic material.

Having thus described my invention, what is claimed is.

1. A rotor for magnetomotive device for an internal combustion engine with a drive shaft and having a flux carrying core with pole shoes disposed on opposite sides of a permanent magnet, the improvement comprising an integral core member which includes a hub portion adapted to receive and be rotated by the shaft of said engine, a counterweight portion and a pair of radially extending, circumferentially spaced, resiliently flexible arm portions diametrically opposed by the counterweight portion of the core, each of the arm portions terminate at their outer ends in pole shoes configured to retain said magnet therebetween and being characterized by a configuration and distribution of mass so as to exert increasing clamping forces on opposite end portions of the permanent magnet with increased speeds of rotation of the rotor, the core and magnet assembly being disposed within a molded synthetic plastic material which forms the rotor body, said core being dynamically independent of the structural strength of the plastic rotor body.

2. A rotor for magnetomotive device, as set forth in claim 1, in which each arm portion of the core has its center of gravity located circumferentially outward of a given radius from the center of rotation through the part of each arm portion which extends from the hub portion of the core so that centrifugal force generated by high speed rotation of the rotor exerts opposing inwardly directed forces on the arm portions for securely clamping the permanent magnet therebetween.

3. A rotor for magnetomotive device, as set forth in claim 1, in which said core is of laminated construction.

* * * * *